US012617073B1

(12) United States Patent
Hsieh

(10) Patent No.: US 12,617,073 B1
(45) Date of Patent: May 5, 2026

(54) EXPANDABLE TOOL HOLDER WITH MODULAR MAGNETIC ASSEMBLY

(71) Applicant: Chih-Chien Hsieh, Taichung City (TW)

(72) Inventor: Chih-Chien Hsieh, Taichung City (TW)

( * ) Notice: Subject to any disclaimer, the term of this patent is extended or adjusted under 35 U.S.C. 154(b) by 18 days.

(21) Appl. No.: 18/935,681

(22) Filed: Nov. 4, 2024

(51) Int. Cl.
*B25H 3/04* (2006.01)

(52) U.S. Cl.
CPC ..................................... *B25H 3/04* (2013.01)

(58) Field of Classification Search
CPC ........................................................ B25H 3/04
USPC ........ 206/349, 370, 372, 373, 818; 211/70.6
See application file for complete search history.

(56) References Cited

U.S. PATENT DOCUMENTS 10,052,754 B1 * 8/2018 Coleman, Jr. ............ B25H 3/04
2004/0238466 A1 * 12/2004 Shiao ....................... B25H 3/04 211/DIG. 1
2006/0234846 A1 * 10/2006 Tucker ..................... B25H 3/04 483/26
2023/0158660 A1 * 5/2023 Schneider ................ B25H 3/04 211/70.6
2025/0073888 A1 * 3/2025 Cacciabeve .............. B25H 3/04

* cited by examiner

*Primary Examiner* — Jacob K Ackun

(57) ABSTRACT

The present invention provides an expandable tool holder with a modular magnetic assembly, comprising: a holder body including a tool holder section and two extension sides; two assembly positioning slots formed on the extension sides, each slot including an embedding space, a support wall, an insertion opening, a longitudinal stop, and a transverse stop, wherein the directions of the longitudinal and transverse stops intersect and maintain a distance therebetween; and a rigid magnetic assembly comprising two magnetic elements, each having a first and second end, assembled with the assembly positioning slots. Each magnetic element is inserted obliquely into the embedding space from the insertion opening, resulting in a secured positioning state in which the second end is contacted by the transverse stop, and a portion of the outer contact surface is contacted and limited by the longitudinal stop.

7 Claims, 6 Drawing Sheets

EXPANDABLE TOOL HOLDER WITH MODULAR MAGNETIC ASSEMBLY

FIELD OF INVENTION

The present invention relates to a tool holder and more particularly to an innovative expandable tool holder structure featuring a modular magnetic assembly.

BACKGROUND OF THE INVENTION

In conventional tool holder designs, whether magnetic structures are incorporated for positioning needs or for expansion and connection purposes, magnetic elements are typically integrated and fixed within the tool holder structure by insert injection molding.

However, this structure of combining magnetic elements presents cost-related issues, both in terms of production molds and manufacturing processes. In addition, when the tool holder is damaged and needs to be disposed of, it becomes difficult to separate the plastic components from the magnetic elements during recycling, resulting in classification issues and failure to meet environmental protection standards. These issues and shortcomings are significant technical challenges that warrant industry attention and innovation.

SUMMARY OF THE INVENTION

The main purpose of the present invention is to provide an expandable tool holder with a modular magnetic assembly, aiming to solve the technical problem of how to develop a novel tool holder with enhanced utility through innovative breakthroughs.

To achieve this purpose, the technical features of the solution of the present invention include, in particular, an expandable tool holder comprising:

A holder body is made of a plastic material and includes a tool holder section and two extension sides arranged in a mutually spaced configuration. Two assembly positioning slots are respectively formed on the two extension sides of the holder body, each assembly positioning slot comprising an embedding space, a support wall, an insertion opening, a longitudinal stop, and a transverse stop. The inner side of the longitudinal stop forms a longitudinal guide wall, while the inner side of the transverse stop forms a transverse guide wall. The extending directions of the longitudinal guide wall and the transverse guide wall intersect and maintain a distance therebetween, thereby defining the insertion opening. The support wall and the longitudinal guide wall are positioned on opposite sides of the embedding space, which has a stopping end. A rigid magnetic assembly comprises two magnetic elements respectively assembled with the two assembly positioning slots, each magnetic element being made of a rigid material and having a first end, a second end, an inner contact surface, and an outer contact surface arranged in a mutually spaced configuration, and each magnetic element being inserted obliquely from the insertion opening into the embedding space with the first end, resulting in a secured positioning state in which the second end is contacted and limited by the transverse stop and a portion of the outer contact surface is contacted and limited by the longitudinal stop. Each longitudinal guide wall forms a guide slope section; the first end of the magnetic element and the stopping end of the embedding space are in a dimensionally matching relationship and defining a virtual extension line using the stopping end and the support wall junction point as a base point, the virtual extension line being parallel to the guide slope section of the longitudinal guide wall and passing through the transverse stop.

The effects and advantages of the present invention mainly lie in the fact that, due to the assembly positioning characteristics of the magnetic element, product mold and manufacturing costs can be greatly reduced, thereby improving industrial economic efficiency while maintaining utility. Furthermore, when the expandable tool holder is discarded due to damage, the magnetic element and the plastic holder body can be easily disassembled and separated, facilitating resource classification and recycling, thus better meeting environmental protection requirements.

Another purpose of the present invention is achieved through the additional technical feature of forming a rounded corner at the end of the guide slope section of the longitudinal stop, thereby providing the advantage and utility improvement of enabling smoother and unobstructed insertion and assembly of the magnetic element into the positioning slot.

Yet another purpose of the present invention is achieved by the additional technical feature of forming mutually engaging male and female connectors at corresponding positions on the two extension sides. When two expandable tool holders of the same type are placed side by side with one of their extension sides adjacent to each other, they can be coupled by mutual engagement of the male and female connectors, thereby achieving the advantage and utility improvement of increasing the stability of the combined expansion state of the two tool holders.

A further purpose of the present invention is achieved through the additional technical feature of forming chamfers at both the first end and the second end of each magnetic element, thereby improving the smoothness of insertion of the magnetic element into the assembly positioning slot and reducing resistance and wear.

DETAILED DESCRIPTION OF THE PREFERRED EMBODIMENTS

Referring to FIGS. 1 to 6, a preferred embodiment of an expandable tool holder with a modular magnetic assembly according to the present invention is illustrated. However, this embodiment is provided for illustrative purposes only and does not limit the scope of the patent application to the specific structure shown.

Figure 3:
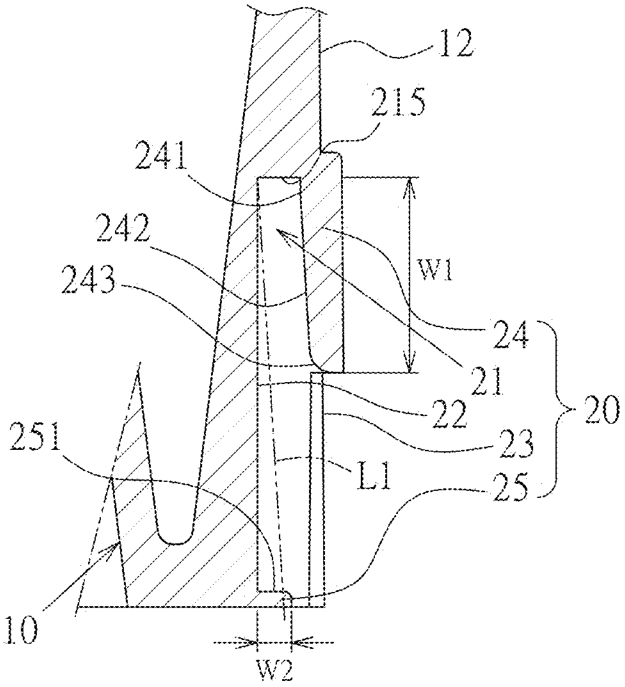
FIG. 3 is a vertical sectional view of one of the assembly positioning slots of the preferred embodiment of the present invention.

The expandable tool holder comprises the following components: a holder body 10 made of a plastic material, which comprises at least one tool holder section 11 and two extension sides 12 positioned in a mutually spaced arrangement; two assembly positioning slots 20 formed respectively on the two extension sides 12 of the holder body 10, each assembly positioning slot 20 comprising an embedding space 21, a support wall 22, an insertion opening 23, a longitudinal stop 24, and a transverse stop 25. The inner side of the longitudinal stop 24 forms a longitudinal guide wall 241, while the inner side of the transverse stop 25 forms a transverse guide wall 251. The extending directions of the longitudinal guide wall 241 and the transverse guide wall 251 intersect while maintaining a distance therebetween, thereby defining the insertion opening 23. The support wall 22 and the longitudinal guide wall 241 are positioned on opposite sides of the embedding space 21, which has a stopping end 215. In addition, the tool holder includes a rigid magnetic assembly 30 consisting of two magnetic elements 31A, 31B respectively assembled with the two assembly positioning slots 20. Each magnetic element 31A (or 31B) is made of a rigid material and comprises a first end 311, a second end 312, an inner contact surface 313 and an outer contact surface 314 arranged in a mutually spaced configuration. Each magnetic element 31A (or 31B) is inserted obliquely with its first end 311 into the embedding space 21 through the insertion opening 23, resulting in a secured positioning state in which the second end 312 is contacted and limited by the transverse stop 25, while a portion of the outer contact surface 314 is contacted and limited by the longitudinal stop 24. Furthermore, each longitudinal guide wall 241 includes a guide slope section 242. The first end 311 of each magnetic element 31A (or 31B) and the stopping end 215 of the embedding space 21 are dimensionally matched. As shown in FIG. 3, a virtual extension line L1 is defined with the junction of the stopping end 215 and the support wall 22 as the base point. This virtual extension line L1 runs parallel to the guide slope section 242 of the longitudinal guide wall 241 and passes through the transverse stop 25.

Figure 4:
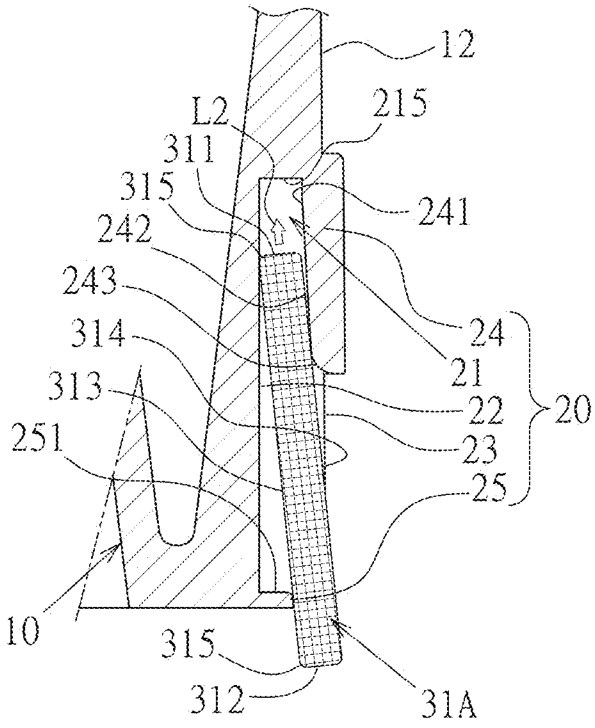
FIG. 4 is an operational state diagram one showing the magnetic element being inserted into the assembly positioning slot of the preferred embodiment of the present invention.

As shown in FIG. 4, in this embodiment, the longitudinal stop 24 forms a rounded corner 243 at the end of the guide slope section 242. This implementation primarily achieves the effect of facilitating a smoother, unobstructed insertion process of the magnetic element 31A (or 31B) into the assembly positioning slot 20, thanks to the characteristic feature of the rounded corner 243. Furthermore, it enables the insertion of the magnetic element 31A (or 31B) without the need to increase the thickness of the longitudinal stop 24, while still maintaining the necessary basic strength of the longitudinal guide wall 241, thus avoiding any indirect impact on the profile shape of the extension side 12.

Figure 1:
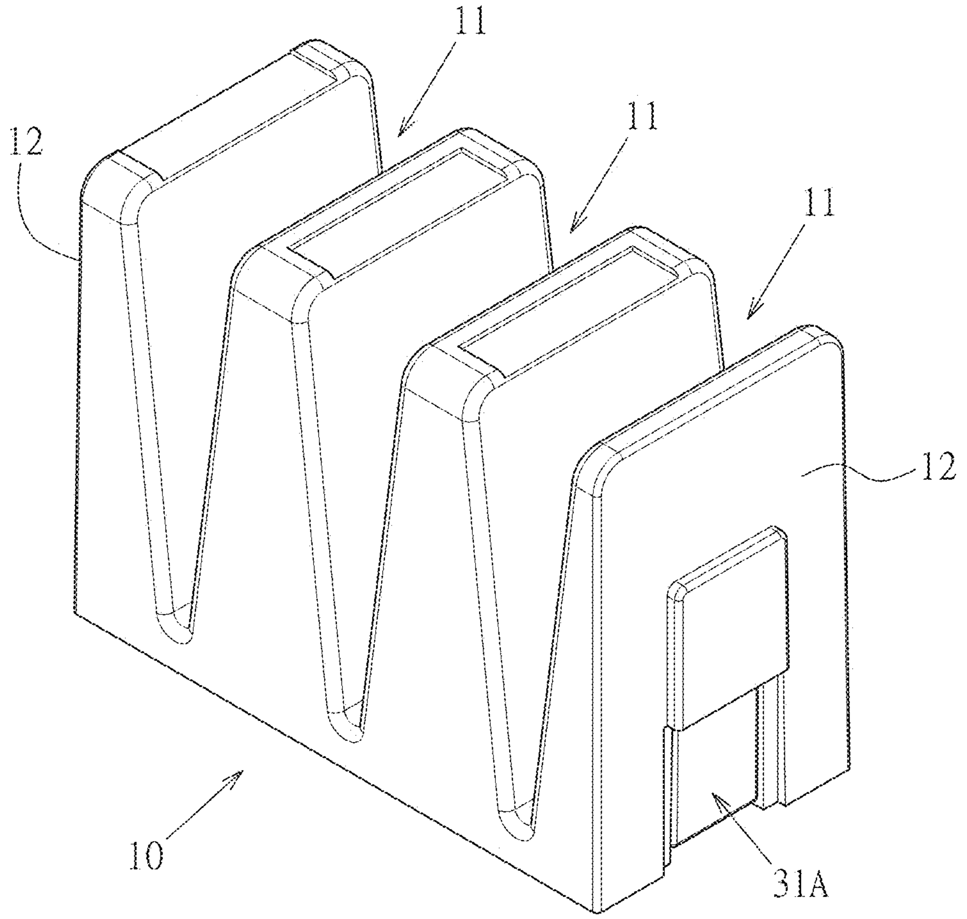
FIG. 1 is an assembled perspective view of the preferred embodiment of the present invention.
Figure 2:
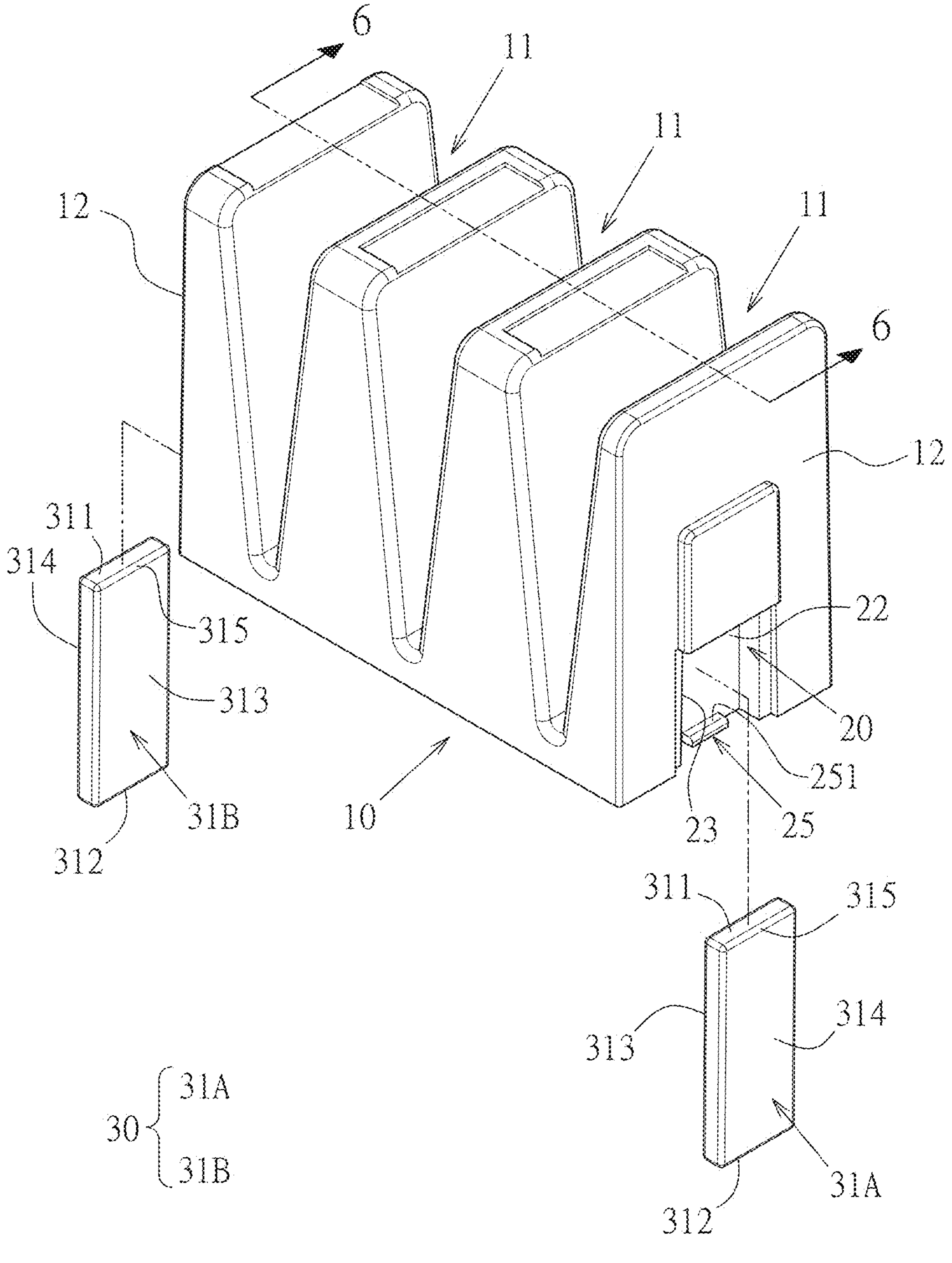
FIG. 2 is an exploded perspective view of the preferred embodiment of the present invention.
Figure 6:
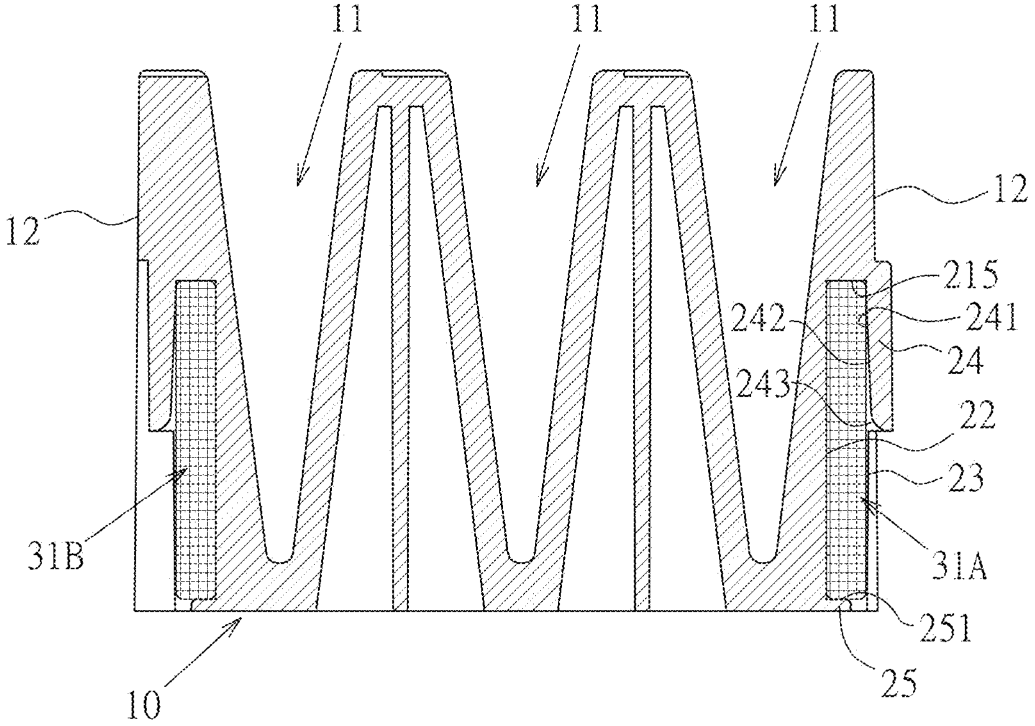
FIG. 6 is a sectional view taken along line 6-6 of FIG. 2.

As shown in FIGS. 2 and 6, in this embodiment, the two magnetic elements 31A and 31B of the rigid magnetic assembly 30 are magnets. Alternatively, the two magnetic elements 31A and 31B may be implemented with one element being a magnet and the other element being made of a magnetically conductive material (such as a neodymium iron boron or iron-cobalt alloy).

As shown in FIG. 3, in this embodiment, a longitudinal extension range W1 of the longitudinal stop 24 is between one-quarter and one-half of the longitudinal height of the magnetic element 31A (or 31B). A transverse extension range W2 of the transverse stop 25 is between one-half and the full thickness of the magnetic element 31A (or 31B) in the transverse direction. The component proportions defined in this embodiment are primarily intended to ensure that the longitudinal stop 24 covers a sufficient length to allow the transverse extension range W2 of the transverse stop 25 to remain within the thickness of the magnetic element 31A (or 31B), thus avoiding any indirect impact on the profile shape of the extension side 12. In addition, this construction also prevents the magnetic element 31A (or 31B) from swinging freely.

Figure 7:
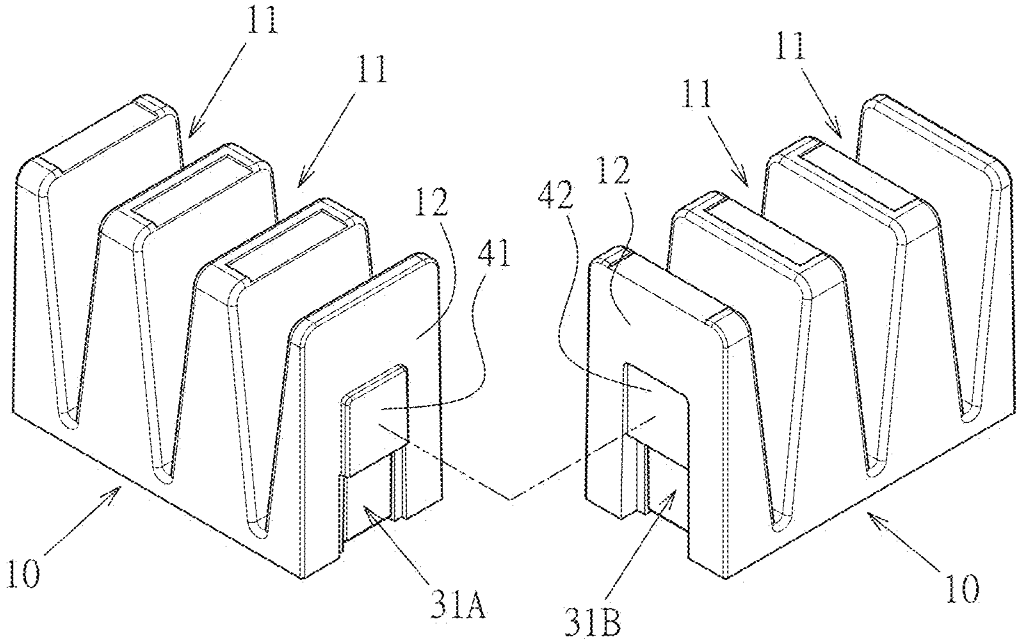
FIG. 7 is a perspective view showing the implementation example of the male and female connectors formed for mutual engagement at the two extension sides of the preferred embodiment of the present invention.
Figure 8:
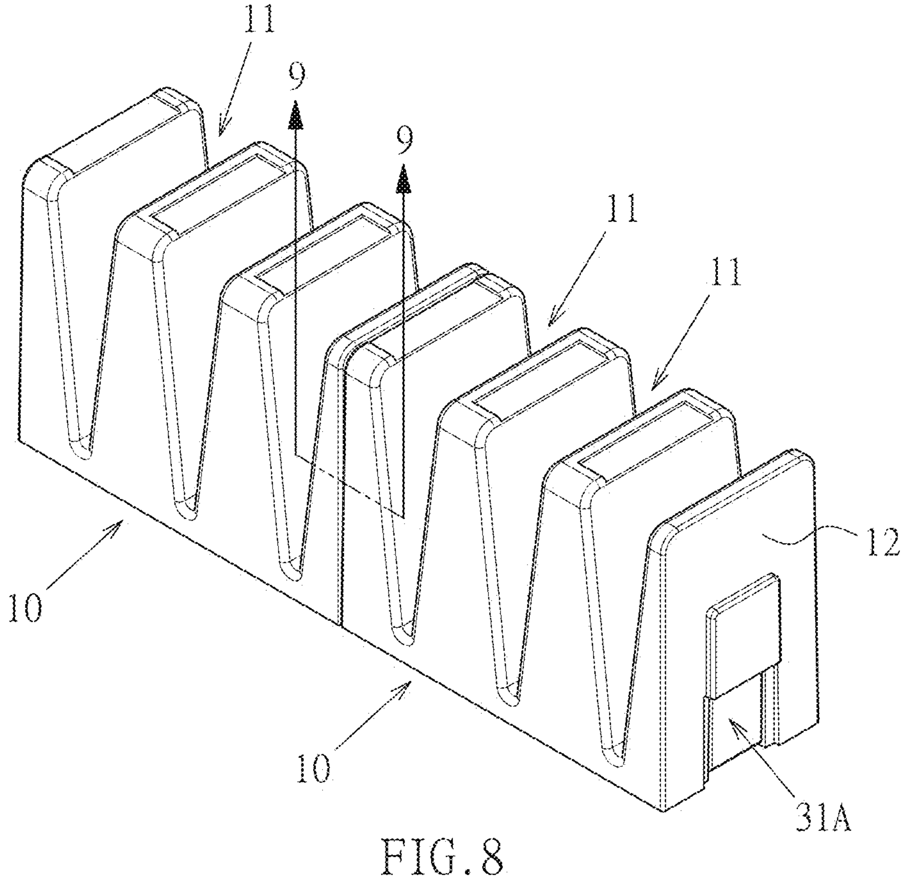
FIG. 8 is a perspective view showing two expandable tool holders in an adjacent side-by-side state following FIG. 6.
Figure 9:
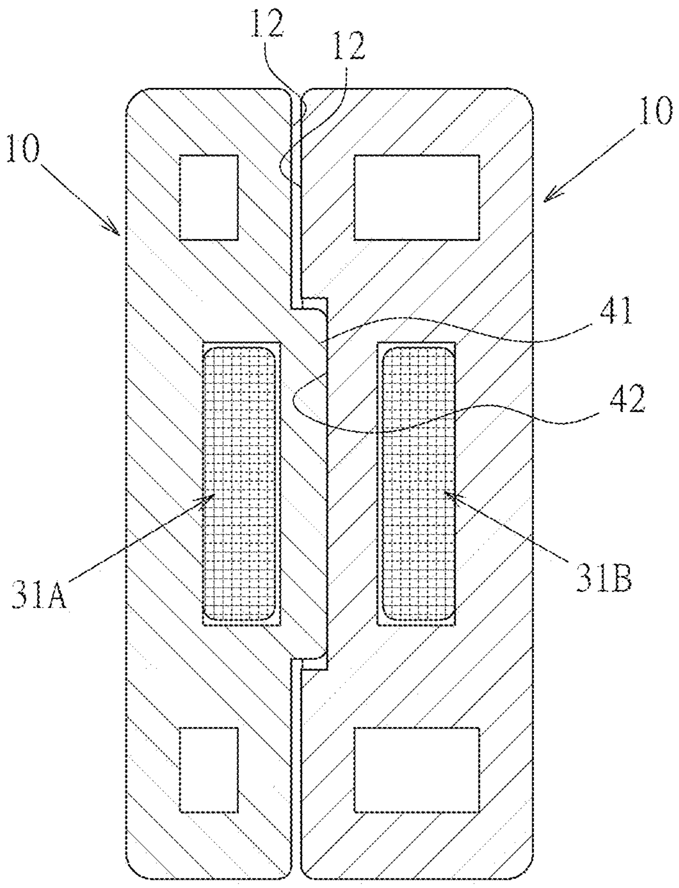
FIG. 9 is a sectional view taken along line 9-9 of FIG. 7.

As shown in FIG. 7, in this embodiment, corresponding positions on the two extension sides 12 of the expandable tool holder are further provided with a male connector 41 and a female connector 42 which can engage with each other. Through this configuration, when two expandable tool holders of the same type are placed side by side with one of their extension sides 12 adjacent to the other as shown in FIG. 8, they can be coupled together via the mutual engagement of the male connector 41 and the female connector 42 (as shown in FIG. 9), thereby increasing the stability of the combined expansion state of the two tool holders.

Figure 5:
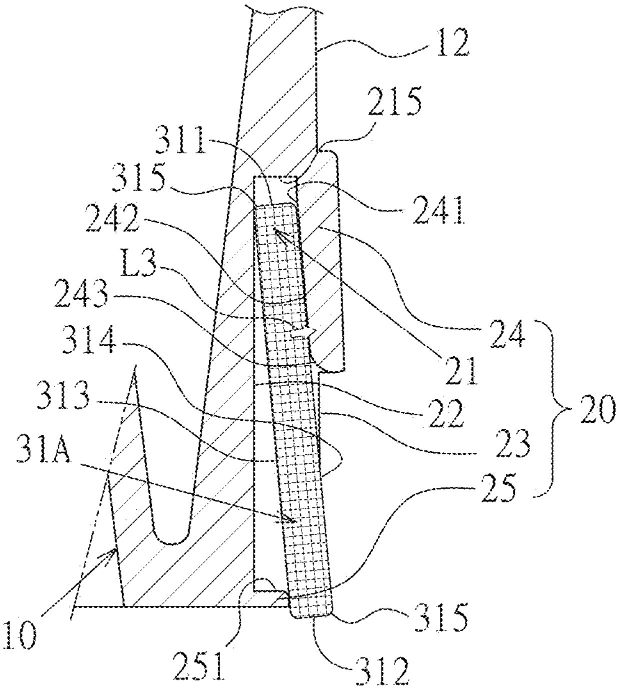
FIG. 5 is an operational state diagram two showing the magnetic element being inserted into the assembly positioning slot of the preferred embodiment of the present invention.

As shown in FIGS. 4 and 5, in this embodiment, both the first end 311 and the second end 312 of each magnetic element 31A (or 31B) are formed with chamfers 315. This feature primarily enhances the smoothness of insertion of the magnetic element 31A (or 31B) into the assembly positioning slot 20, by reducing resistance and wear due to the characteristic of the chamfers 315.

Through the above structural composition and technical features, the use of the expandable tool holder with a modular magnetic assembly as described in the present invention is demonstrated in the process of inserting the magnetic element 31A (or 31B) into the assembly positioning slot 20. This process is illustrated with the magnetic element 31A in FIGS. 4 and 5. The first end 311 is inserted obliquely into the embedding space 21 through the insertion opening 23 (as indicated by arrow L2 in FIG. 4). During insertion, the longitudinal stop 24 is stretched and slightly elastically moved outwardly by the tilted magnetic element 31A (as indicated by arrow L3 in FIG. 5). As shown in FIG. 6, the second end 312 is then contacted and limited by the transverse stop 25, resulting in a secured positioning state in which a portion of the outer contact surface 314 is contacted and limited by the longitudinal stop 24. During this assembling process, the guide slope section 242 formed by the longitudinal guide wall 241 in combination with the inherent elasticity of the plastic material used for the longitudinal stop 24, facilitates near-surface contact between the magnetic element 31A and the longitudinal guide wall 241, thereby reducing the likelihood of the longitudinal stop 24 breaking due to excessive deformation. This enhances the smoothness of assembly of the magnetic element 31A. In addition, the dimensionally matching configuration between the first end 311 of the magnetic element 31A and the stopping end 215 of the embedding space 21 ensures that the first end 311 is stably secured after full insertion, thereby preventing the magnetic element 31A from exhibiting any overall swaying. Since the magnetic element 31A in the present invention adopts an assembly positioning method, it significantly reduces mold and manufacturing costs, thereby offering better industrial economic benefits while maintaining utility. Moreover, when the expandable tool holder needs to be discarded due to damage, the magnetic element 31A can be easily disassembled and separated from the plastic holder body 10, thus facilitating resource classification and recycling, meeting environmental protection requirements.

It is also worth mentioning that the downward-facing second end 312 of the magnetic element 31A (or 31B) can generate a magnetic attraction when the expandable tool holder is placed on a metal surface, such as a drawer or workbench (note: referring to embodiments where magnets are used). This feature further benefits stable positioning when the expandable tool holder is placed.

What is claimed is:

1. An expandable tool holder with a modular magnetic assembly, comprising:

a holder body made of a plastic material and including at least one tool holder section and two extension sides arranged in a mutually spaced configuration;

two assembly positioning slots respectively formed on the two extension sides of the holder body, each assembly positioning slot including an embedding space, a support wall, an insertion opening, a longitudinal stop, and a transverse stop, wherein an inner side of the longitudinal stop forms a longitudinal guide wall, and an inner side of the transverse stop forms a transverse guide wall, the extending direction of the longitudinal guide wall and the transverse guide wall intersect and maintain a distance therebetween, thereby defining the insertion opening, with the support wall and the longitudinal guide wall being positioned on opposite sides of the embedding space having a stopping end; and a rigid magnetic assembly comprising two magnetic elements respectively assembled with the two assembly positioning slots, each magnetic element being made of a rigid material and having a first end, a second end, an inner contact surface, and an outer contact surface arranged in a mutually spaced configuration, each magnetic element being inserted with its first end obliquely into the embedding space from the insertion opening, resulting in a secured positioning state in which the second end is contacted and limited by the transverse stop, and a portion of the outer contact surface is contacted and limited by the longitudinal stop; and wherein, each longitudinal guide wall forms a guide slope section;

the first end of the magnetic element and the stopping end of the embedding space are in a dimensionally matching relationship and defining a virtual extension line using the stopping end and the support wall junction point as a base point, the virtual extension line being parallel to the guide slope section of the longitudinal guide wall and passing through the transverse stop.

2. The expandable tool holder with a modular magnetic assembly according to claim 1, wherein the longitudinal stop forms a rounded corner at the end of the guide slope section.

3. The expandable tool holder with a modular magnetic assembly according to claim 1, wherein both of the magnetic elements of the rigid magnetic assembly are magnets.

4. The expandable tool holder with a modular magnetic assembly according to claim 1, wherein the two magnetic elements of the rigid magnetic assembly include one magnetic element which is a magnet and the other magnetic element which is made of a magnetically conductive material.

5. The expandable tool holder with a modular magnetic assembly according to claim 1, wherein the longitudinal extension range of the longitudinal stop is between one-quarter and one-half of the longitudinal height of the magnetic element, and the transverse extension range of the transverse stop is between one-half and the full thickness of the magnetic element.

6. The expandable tool holder with a modular magnetic assembly according to claim 1, wherein the two extension sides of the expandable tool holder are further provided with a mutually engaging male connector and a female connector.

7. The expandable tool holder with a modular magnetic assembly according to claim 1, wherein both the first end and the second end of each of the magnetic elements are formed with chamfers.

* * * * *